C. P. BYRNES.
TIE PLATE.
APPLICATION FILED FEB. 17, 1910.

981,378.

Patented Jan. 10, 1911.
2 SHEETS—SHEET 1.

WITNESSES
R. A. Balderson
J. B. Fleming

INVENTOR
Clarence P. Byrnes

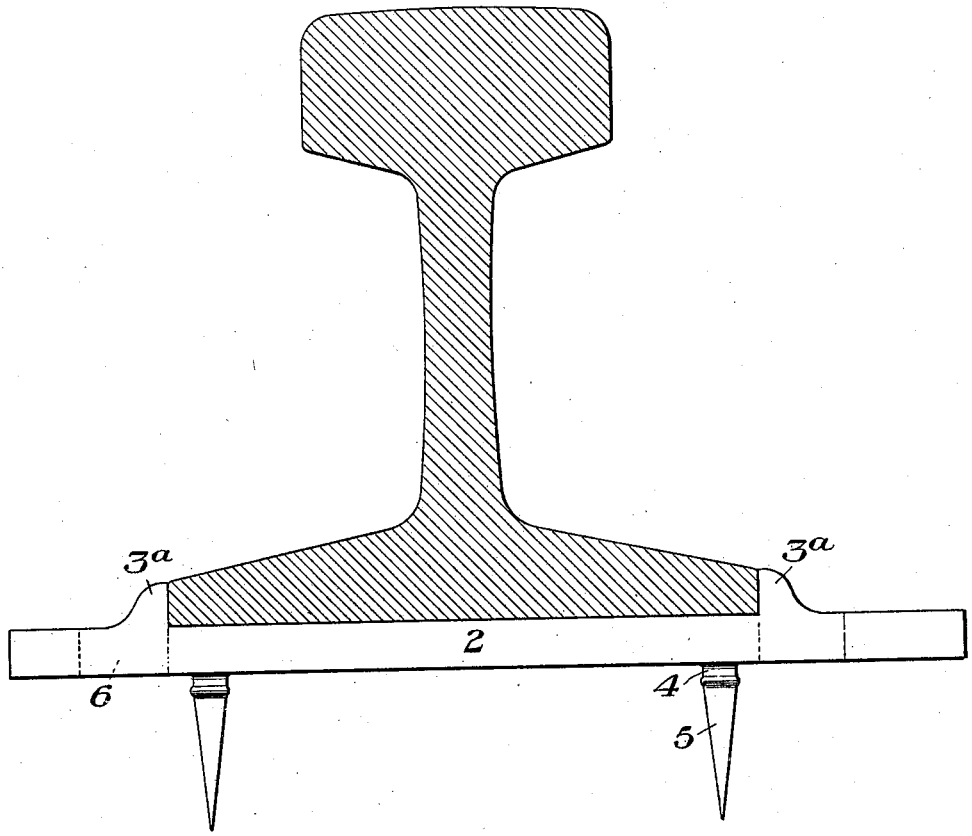
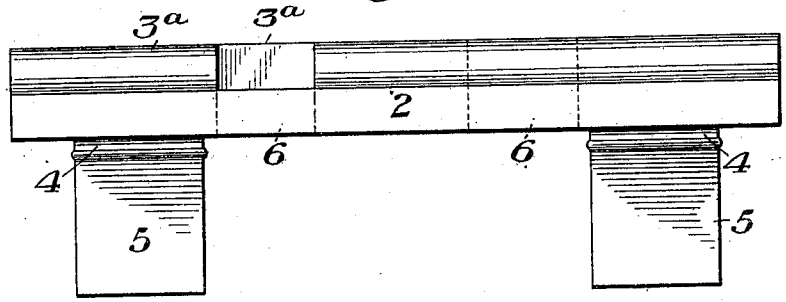

UNITED STATES PATENT OFFICE.

CLARENCE P. BYRNES, OF SEWICKLEY, PENNSYLVANIA.

TIE-PLATE.

981,378.

Specification of Letters Patent. Patented Jan. 10, 1911.

Application filed February 17, 1910. Serial No. 544,389.

*To all whom it may concern:*

Be it known that I, CLARENCE P. BYRNES, of Sewickley, Allegheny county, Pennsylvania, have invented a new and useful Improvement in Tie-Plates, of which the following is a full, clear, and exact description, reference being had to the accompanying drawings, forming part of this specification, in which—

Figure 1:
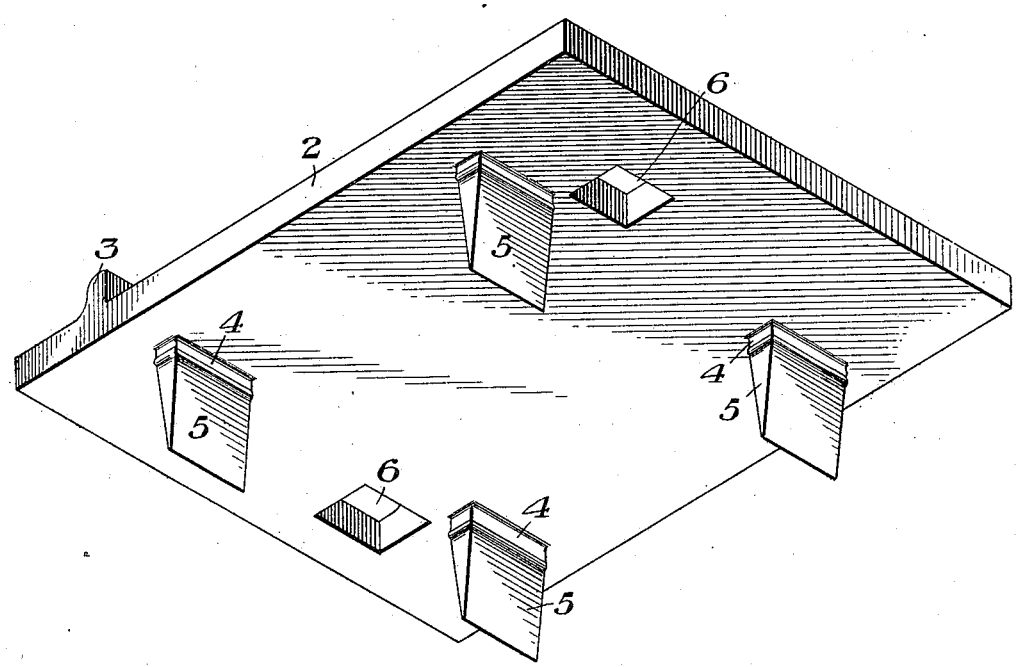
Figure 2:
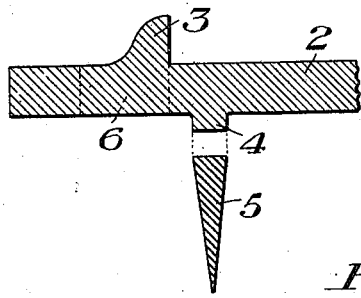
Figure 3:
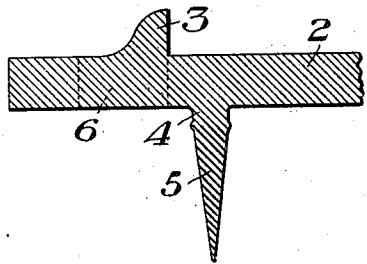
Figure 4:
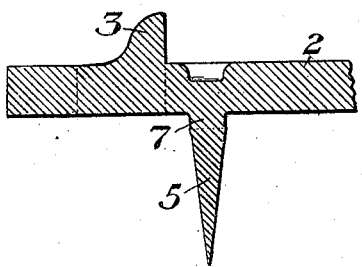

Figure 1 is a perspective view of the tie plate, constructed in accordance with my invention; Fig. 2 is a sectional detail view, showing a portion of the tie plate and one of the separately formed claws; Fig. 3 is a sectional detail view, showing the claw welded to the plate; Fig. 4 is a similar view, but showing a modification and Figs. 5 and 6 are end and side elevations, respectively, showing a modified form of tie plate.

My invention relates to the class of tie plates for railroads, and is designed to provide an improved device of this kind, in which the claws or ribs can be located wherever desired, and the manufacture of the plate can be cheapened and facilitated.

Heretofore in the manufacture of rolled or wrought metal plates having claws on their lower side, these claws have been cut or sheared from continuous flanges or ribs rolled on the lower face of the plate. Such method requires that the ribs shall be quite close to the edge of the plate in order to reach them for the shearing operation; and, moreover, causes a large amount of waste in the sheared-away portions to form the separated claws.

My invention consists in rolling the plate without claws or tie-entering flanges on its lower surface, and then welding separately formed claws or flanges to the lower surface by any of the well known methods, such as electric welding or oxy-acetylene welding.

In carrying out the method, the plate is preferably provided with shallow projections of a size and location corresponding to the application of the claws or flanges. The separately formed claws or flanges are then applied to these projections and welded thereto.

In the drawings, referring to Figs. 1, 2 and 3; 2 represents an ordinarily rolled tie plate having on its top a rolled rib 3, and provided on its lower side with separated rolled projections 4. I have shown these as four in number, though any desirable number may be used. The claws 5 are formed separately, preferably by rolling a bar which corresponds in cross-section to the claw, this bar then being severed transversely to give claws of the desired horizontal length. The claws may, however, be forged separately or formed in any desirable manner. The claws are then applied to and preferably fit neatly against the projections which are of corresponding size to the base of the claw, and are then welded thereto, preferably by an electric welding machine, or by the oxy-acetylene or similar methods. This welding will ordinarily make a slight bulge at the joint between the projection and the claw, but this is of no disadvantage, though it may be ground off or removed if desired.

The claws are preferably placed within the lines of the rail-supporting portion of the plate. This gives a considerable advantage over former claw plates, since the plate may be driven by the traffic without danger of bending or bulging the plate downwardly between the claws. In claw plates where the claws are placed outside of the lines of the rail, in order to get access for shearing off the flanges and forming the claws, there is liability of bending the plate down if the plate is driven by the cars passing on the rails over the plate. In the form shown, there are two spike holes, 6, 6 located in staggered relation, one passing through the top rib 3. The location of these spike holes may, however, be varied, as desired, as may also the location of the claws or flanges, and also that of the rib if such is used.

In Figs. 5 and 6, I show a modified form of plate wherein two upper ribs 3ª are employed. Instead of rolling the projections on the surface of the plate, I may roll a flat plate and thereafter strike up these projections from the body of the plate as shown at 7 in Fig. 4. This projection is of especial advantage in welding the claw to the plate by modern methods, especially in electric welding.

The advantages of my invention result from the welding of separate claws or flanges to the tie plate. In this way the claws or flanges may be of any desirable size or length, and may be placed at any desirable points on the surface of the plate.

The labor of shearing away portions of the flanges to form claws is done away with, the loss of metal in the sheared-away portions is saved, and a strong and serviceable article is provided. The invention is of especial advantage in being able to place the claws or flanges beneath the rail base in a rolled plate.

Many variations may be made in the form and arrangement of the plate, the claws or flanges, &c., without departing from my invention.

By the word "claw" in the claims I intend to cover any downward projection of less length than the tie plate and arranged to be embedded in the tie.

I claim:—

1. A rolled tie plate having claws welded to its bottom portion; substantially as described.

2. A rolled tie plate having an integral projection and a claw welded to said projection; substantially as described.

3. A rolled tie plate having claws welded to an imperforate portion thereof and arranged underneath the rail-bearing portion of the plate; substantially as described.

4. A rolled tie plate having a plurality of separated claws welded to its lower face portion, said claws being of less length than the plate; substantially as described.

5. A rolled tie plate having integral bottom projections, and claws welded to said projections; substantially as described.

6. A rolled tie plate having a projecting top rib, and separated claws welded to the lower portion of the plate and within its rail-bearing portion; substantially as described.

7. A rolled tie plate having upper rolled ribs arranged to engage the opposite edges of the rail base, and claws welded to its lower surface between the top ribs; substantially as described.

In testimony whereof, I have hereunto set my hand.

CLARENCE P. BYRNES.

Witnesses:
 GEO. B. BLEMING,
 H. M. CORWIN.